April 6, 1943.    P. A. KINZIE    2,315,797
SEAL MEANS FOR TUBE VALVES
Filed June 10, 1941
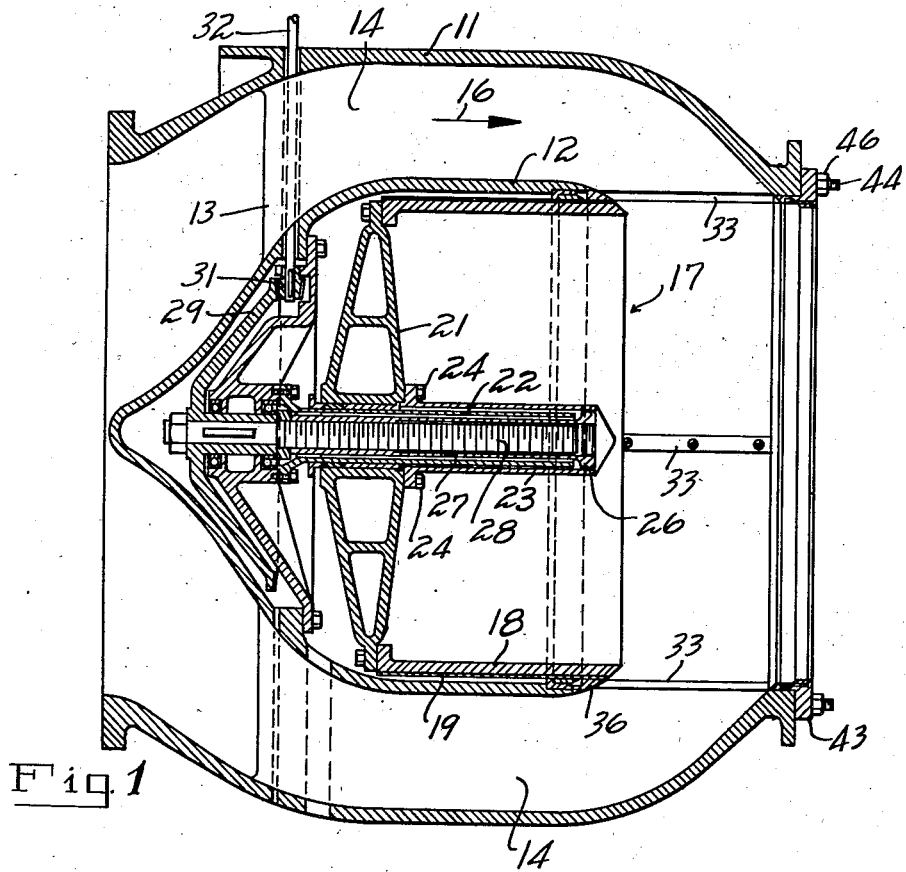
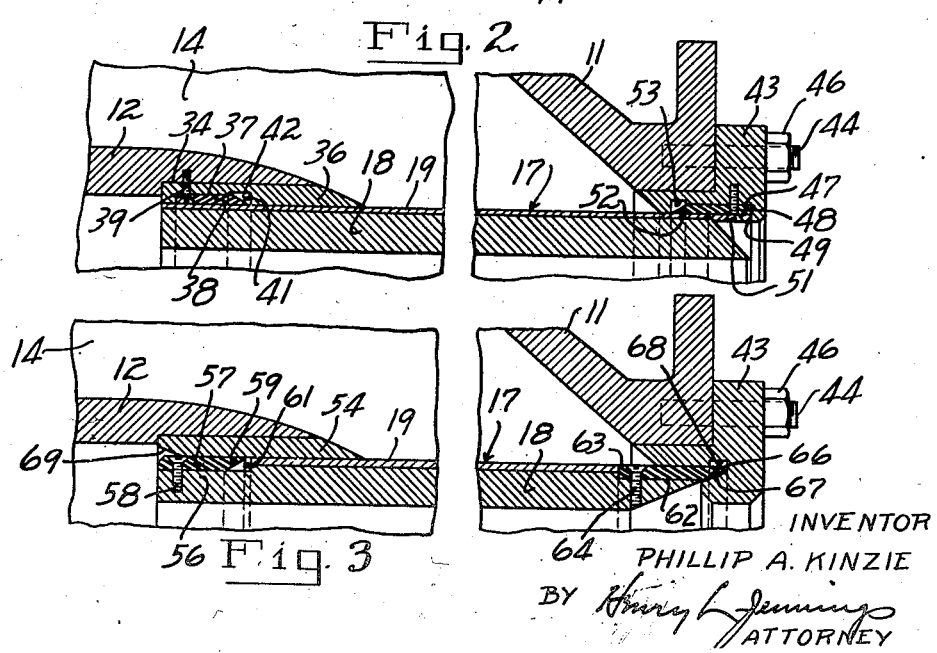
INVENTOR
PHILLIP A. KINZIE
BY
ATTORNEY Patented Apr. 6, 1943

2,315,797

UNITED STATES PATENT OFFICE 2,315,797

SEAL MEANS FOR TUBE VALVES

Phillip A. Kinzie, Denver, Colo.

Application June 10, 1941, Serial No. 397,382

2 Claims. (Cl. 251—78)

My invention relates to an improvement in tube valves, and has for an object the provision of a tube valve embodying a novel sealing means in the form of resilient gaskets so constructed and disposed with respect to the relatively movable elements of the valve as to cause the pressure of the controlled fluid to act on the gaskets and press them into leak-tight engagement, thus to seal the fluidway against leakage when the valve is closed.

More particularly, my invention has as an object the provision of fluidway sealing means adapted for use with tube valves of the general type disclosed in my copending application, Serial No. 276,593, filed May 31, 1939, now Patent No. 2,269,671 granted January 13, 1942, of which the present application is a continuation in part.

Another object of my invention is to provide annular gaskets at the upstream and downstream ends of the valve fluidway, both of which gaskets are cooperable with the closure tube, and both of which are provided with tapered edges, whereby, upon closing the valve, pressure from the fluidway acts on the tapered edges and presses the gaskets into leak-tight engagement with the closure tube.

A further object of my invention is to provide gaskets of the character described formed of resilient material, such as rubber, in combination with annular openings or spaces in the metal parts of the valve adjacent the tapered edges of the gaskets to permit fluid under pressure from the fluidway to have access to said tapered edges and press them tightly into contact with the adjacent valve parts.

A further object of my invention is to provide sealing means of the character described which shall be secured to the stationary parts of the valve, so that the closure tube and its anti-friction shell may be plain and smooth.

A still further object of my invention is to provide means for mounting gaskets having tapered edges on the closure tube itself, the gaskets being secured thereto in such manner as to offer practically no resistance to the flow of fluid around the closure tube.

Apparatus embodying features of my invention is illustrated in the accompanying drawing forming a part of this application, in which Fig. 1 is a sectional view of a tube valve in the fully open position and illustrating one form of my improved sealing means associated therewith;

Fig. 2 is an enlarged fragmental sectional view of the valve and sealing means shown in Fig. 1; and Fig. 3 is a view similar to Fig. 2, illustrating a modified form of my invention in which the gaskets are secured to and move with the closure tube.

Referring to the drawing, I have illustrated my invention as applied to a tube valve of the type shown in my said copending application, but as will become apparent, it is adapted for use with any tube valve having inner and outer, relatively movable portions. As shown, the valve comprises an outer body portion 11, and an inner cylindrical portion 12 which is secured to the portion 11 by means of a number of longitudinal ribs 13. This construction is such as to provide an annular fluidway 14 between the portions 11 and 12, through which fluid flows in the direction of the arrow 16.

Slidably mounted within the inner body portion 12 is a closure tube 17 which may comprise a relatively heavy annular member 18 around which is fitted a shell 19. The shell 19 is made of highly polished, non-corrodible metal so as to present a smooth surface to the fluid flowing in the fluidway 14 when the valve is partly closed.

The particular means illustrated for moving the closure tube 17 to closed position is described and claimed in my copending application aforesaid, and no detailed description is necessary here. Suffice it to say that the closure tube 17 is mounted on a cross head 21, which in turn is slidable on a torque tube 22. A thrust tube 23 is secured to the cross head by means of bolts 24, and the thrust tube 23 is attached as at 26 to a nut tube 27, which latter is in threaded engagement with a stem 28. Keyed to the upstream end of the stem 28 is a bevel gear 29 in mesh with a bevel pinion 31. The pinion 31 is keyed to a shaft 32 which extends exteriorly of the valve where it is connected to any suitable means (not shown) for rotating the same.

Upon rotation of shaft 32 in clockwise direction the closure tube 17 moves axially of the valve to closed position, guides 33 being provided for holding the closure tube in correct position.

Referring now more particularly to Figs. 1 and 2 of the drawing, I show one means of sealing the fluidway 14 against loss of the controlled fluid when the valve is closed, it being understood that seals are required at both the upstream and downstream ends of closure tube. Fitting within an annular recess 34 of the inner cylindrical portion 12 is a liner 36 within which the shell 19 slides. The liner 36 is provided with an inwardly opening recess 37 adapted to receive an annular gasket 38 formed of any suitable resilient material, such as rubber. The gasket is held in place by means of a plurality of screws 39, the heads of which are countersunk into the gasket 38.

It will be noted that the downstream edge of the gasket 38 is tapered as shown at 41, and that the liner 36 is further recessed as at 42 to provide a circumferentially extending opening at the tapered edge 41 of the gasket 42. The purpose of this construction will be later described.

At the valve outlet I provide a nozzle ring 43 secured to the valve body 11 by means of studs 44 and nuts 46. The nozzle ring is provided with an inwardly opening recess 47 within which is seated a second annular gasket 48, similar to 38. The gasket 48 is held in place by means of an annular clamp bar 49 and screws 51. The gasket 48 has its upstream edge tapered, as at 52, and the nozzle ring 43 is further recessed, as at 53, adjacent the tapered end 52 of the gasket.

From the foregoing the operation of my improved sealing arrangement will be readily apparent. When the closure tube 17 is fully closed, as shown in Fig. 2, fluid is held under pressure in the fluidway 14. The two gaskets 38 and 48 surround the shell 19 at each end, it being noted that the annular clamp bar 49 acts as a stop to prevent the closure tube from travelling too far.

The joints between the liner 36 and the shell 19, and between the inner portion of the nozzle ring 43 and the shell 19, being slide fits, are not fluid tight. Fluid under pressure from the fluidway 14, therefore, will force its way into the recesses 42 and 53, and into contact with the tapered edges 41 and 52 of the gaskets. When this occurs, it is evident that the tapered edges of the gaskets are, due to the hydraulic pressure, forced tightly into contact with the shell 19 of the closure tube, and thus prevent loss of fluid at both the upstream and downstream ends of the closure tube.

Referring now more particularly to Fig. 3, I show a somewhat modified form of my invention. A liner 54 is fitted within the inner cylindrical portion 12 and acts as a bushing for the slidable closure tube 17. The shell 19 stops short of the upstream end of the closure tube, and adjacent the end thereof the closure tube member 18 is provided with a reduced portion 56 around which is seated an annular gasket 57, secured thereto by screws 58. The downstream edge of the gasket 57 is tapered as at 59, so as to leave an open space 61, similar to 48, adjacent the tapered edge.

At its other end, the member 18 is reduced to provide a seat 62 for the downstream gasket 63, which latter is likewise held in place by screws 64. The downstream edge of the gasket 63 is tapered as shown at 66, and is adapted to seat against a complemental tapered portion 67 on the nozzle ring 43. The nozzle ring 43 in this embodiment is provided with a recess 68, similar to 53.

The operation of the second embodiment of my invention is substantially the same as that already described. When the valve is closed, fluid under pressure enters openings 61 and 68, and presses the tapered edges of gaskets 57 and 63 against the liner 54 and the tapered face 67, respectively, thus effectively sealing the fluidway.

The liner 54 is provided with a flared portion 69 on its upstream end so as to facilitate the movement of the closure tube therein by guiding the gaskets 57 and 63 thereinto. This feature materially aids the initial assembly of the valve parts and likewise obviates the danger of the upstream gasket 57 becoming wedged against the liner during the normal closing movement of the closure tube.

Since the gasket 48 shown in Fig. 2 is secured to stationary parts of the valve, the closure tube may be made perfectly smooth and hence it offers little resistance to moving fluid when the valve is only partly closed. Likewise, in the modification shown in Fig. 3, since the gasket 63 is placed flush with the outer circumference of the closure tube, this latter construction is also very smooth.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. In a tube valve having inner and outer body portions forming between them a fluidway, a closure tube, and means for moving the closure tube to closed position, the combination of resilient gaskets secured to the closure tube adjacent the upstream and downstream ends thereof, a liner for the inner body portion surrounding the closure tube with which the upstream gasket cooperates when the valve is closed, a flared section on the upstream side of the liner for guiding the gaskets thereinto, a tapered portion on the downstream edge of the upstream gasket, a tapered portion on the downstream edge of the downstream gasket, a tapered seat against which the tapered edge of the downstream gasket fits when the valve is closed, and means to admit fluid under pressure from the fluidway to the tapered edges of the upstream and downstream gaskets for forcing them into sealing relation with the liner and tapered seat respectively.

2. In a tube valve having inner and outer body portions forming between them a fluidway, a closure tube, and means for moving the closure tube to closed position, liners fitted within the inner and outer cylindrical body portions to form bushings for the closure tube, a smooth metal shell surrounding the closure tube and stopping short of the ends thereof, a reduced portion on each end of the closure tube adjacent the ends of the shell, an annular gasket surrounding the reduced portion at each end of the closure tube, a tapered down stream edge on each of said gaskets, and a tapered seat for the down stream gasket formed at the down stream end of the outer cylindrical member.

PHILLIP A. KINZIE.